Nov. 20, 1962 HISASHI KANEKO 3,065,303

MULTIPLEX PULSE CODE MODULATION SYSTEM

Filed Feb. 6, 1961 4 Sheets-Sheet 1

Inventor
H. Kaneko
By [signature]
Attorney

Inventor
H.Kaneko
By R. H. Morris
Attorney (SYNCHRONIZING CODE 10101)

(SYNCHRONIZING CODE

Inventor
H. Kaneko
By [signature]
Attorney

Nov. 20, 1962 HISASHI KANEKO 3,065,303
MULTIPLEX PULSE CODE MODULATION SYSTEM
Filed Feb. 6, 1961 4 Sheets-Sheet 4

Inventor
H.Kaneko
By [signature]
Attorney

United States Patent Office 3,065,303

Patented Nov. 20, 1962

3,065,303

MULTIPLEX PULSE CODE MODULATION SYSTEM

Hisashi Kaneko, Minato-ku, Tokyo, Japan, assignor to Nippon Electric Company, Limited, Tokyo, Japan, a corporation of Japan Filed Feb. 6, 1961, Ser. No. 87,445
Claims priority, application Japan Feb. 12, 1960
2 Claims. (Cl. 179—15)

This invention relates in general to a multiplex pulse code modulation system and in particular to an improved arrangement for synchronizing such systems. Its principal object is to provide an improved synchronizing circuit arrangement for systems of the above character, which in the event of the collapse of synchronism, considerably reduces the synchronizing recovery time.

In known synchronizing arrangements for time-division multiplex systems, the synchronizing pulses may be uniformly distributed in one frame of pulse code sequences or may be arranged at the beginning of each frame of pulse code sequences. The first type of synchronization is commonly termed the interlace synchronizing system and the latter type is commonly termed the sequence synchronizing system. A description of these two types of synchronizing systems and the manner in which they are synchronized after a collapse of synchronization is given in my copending application, Serial No. 50,628, filed August 19, 1960. In the above application, synchronism recovery, after collapse of synchronism, is accomplished by shifting the relative time positions between the sending and receiving terminal stations of the multiplex system bit-by-bit until the two terminal stations are again synchronized. As described in my later copending application, Serial No. 61,933, filed October 11, 1960, the recovery time of synchronism in a sequence-type synchronizing system can be decreased by shifting the timing between the sending and receiving terminal stations of the multiplex system a variable number of bits. This is accomplished by resetting the separation timing and code sequence control apparatus each time the synchronism collapses. In both of the noted applications, the synchronizing code is composed of a series of mark and space pulses, which code is arbitrarily set at both the sending and receiving terminals of the multiplex system.

According to the present invention, the recovery time of synchronism between the sending and receiving terminals of a multiplex system can be reduced over that present in known systems by utilizing a special synchronizing code. Accordingly, it is an object of this invention to provide apparatus for use with a synchronizing code which reduces the recovery time of synchronism of a time-division multiplex system.

Another object of the invention is to provide apparatus for use with a synchronizing code which is composed of all mark pulses.

A further object of the invention is to provide time-division multiplex system apparatus for use with a synchronizing code which is composed of all space pulses.

Other objects and features of the invention and the manner of obtaining them will become more apparent and the invention will be best understood by reference to the following description of an embodiment of the invention taken in conjunction with the accompanying drawings comprising FIGS. 1 to 7 wherein:

FIG. 1, parts *a* to *d*, discloses code pulses waveforms wherein the synchronizing code pulses (10101) are combined with the channel pulses according to the interlace system and wherein the synchronizing code pulses (10101) (11111) and (00000) are combined with the channel pulses according to the sequence systems;

FIG. 2, parts *a* and *b*, shows a table for explaining the manner of restoring the synchronism in a synchronizing code system using a series of mark and space pulses and using a series of all mark pulses;

FIG. 3, parts *a* and *b*, discloses diagrams for illustrating the principle of the invention;

Figure 1:
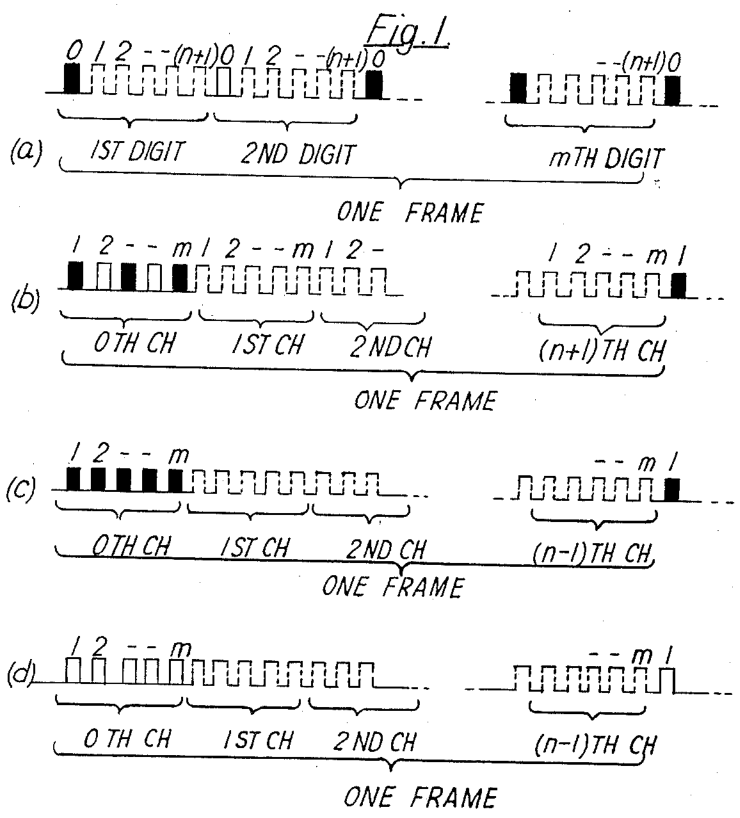

Reference is made to my noted copending applications for a description of the contents of the diagrammatic blocks used in the various figures of the drawings of this application. In FIG. 1, the pulses indicated by solid lines are synchronizing pulses while the pulses indicated by broken lines are signalling pulses. The solid-line pulses which are filled in are mark pulses while those left blank are space pulses. The broken-line pulses are not shown as mark or space pulses but they are assumed to be a series of mark-space sequences.

It is known that excellent transmission quality can be secured when a voice or other signal is transformed into a pulse code modulation (hereinafter abbreviated PCM) signal by quantizing, sampling and encoding. Since PCM uses the principle of sampling, time-division multiplexing is possible in the same manner as in other pulse modulation systems. In a time-division multiplex system according to the prior art, one channel is used for synchronizing pulses in order to synchronize the transmitting end with the receiving end.

In the invention disclosed in my above-mentioned copending applications, binary code digit pulses are used as the synchronizing pulses in the same manner as are the binary code digit pulses used for the signaling channels.

Now let it be assumed that $q$-synchronizing pulses are contained in an $m$-digit, $n$-channel multiplex pulse sequence. In my August 19, 1960 copending application, referred to above, synchronizing equipment is provided with a function such that the transmitted pulse sequence (which contains the synchronizing pulses) and a synchronizing pulse code sequence generated at a receiving station (which has been agreed upon between the transmitting and the receiving terminal stations) are compared against each other at a time at which the synchronizing pulses in the received wave should occur and, if the two sequences are not in coincidence, their relative time position is shifted bit by bit. This operation of comparison is repeated until normal synchronization is recovered.

The waveforms of the interlace system in which $q$-synchronizing pulses are uniformly distributed within a frame of $m \cdot n = N$ pulses are shown in FIG. 1*a*.

In the sequence system, the synchronizing pulses are successively located in a group at the beginning of each frame. The waveforms of the sequence system synchronizing pulses are shown in FIG. 1*b*.

In the sequence system two modes or methods are generally employed. One mode is to shift the channel separator, as in the interlace system, by one bit every time an error is found. The other mode is the resetting type sequence system in which the synchronizing pulse sequence generator is reset every time an error is found. The latter method shown in my October 11, 1960 copending application can remarkably shorten the synchronism restoring time when the number $q$ of the synchronizing pulses in one frame is greater than 1, and has remarkable merits in restoring the collapse of synchronism in a multiplex code communication.

This invention provides an improved resetting type sequence system and relates to a synchronizing system in a time division multiplex pulse code modulation system in which a sepecial code sequence is employed as the synchronizing pulse sequence to decrease the average value of the synchronism restoring time as well as remarkably to decrease the standard deviation of the probability distribution of the restoring time, thus further improving the restoration characteristics of my prior applications. FIGS. 1*c* and 1*d* show respectively, waveforms of the sequence type of synchronism wherein the synchronizing code is all marks and wherein such code is all spaces.

Figure 4:
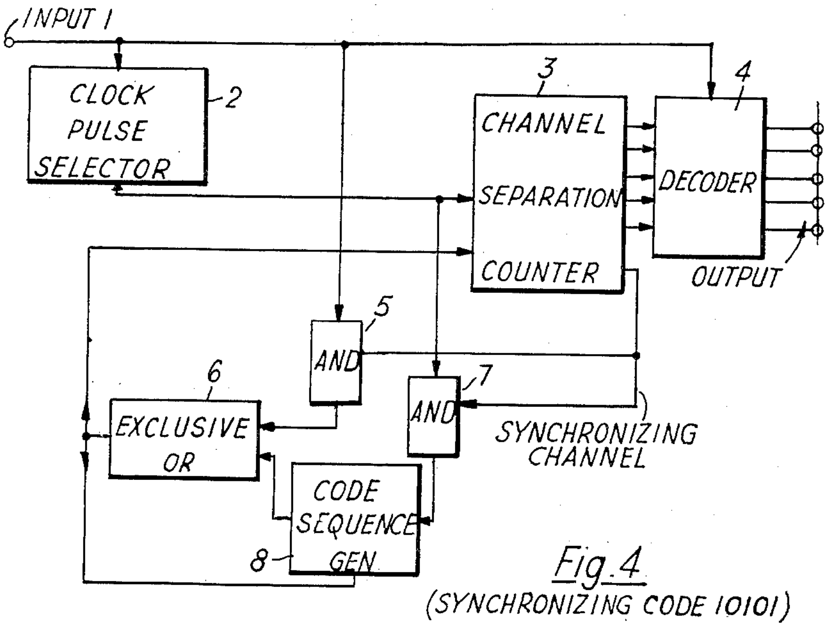
FIG. 4 shows a schematic block diagram of a receiving terminal station equipment illustrating the sequence type of synchronizing system when the synchronizing code is 10101.

FIG. 4 shows the arrangement of receiving station equipment employing the resetting type sequence system described in my October 11, 1960, copending application. When a series of multiplex code pulses is received at a terminal 1, a series of clock pulses is generated by a clock pulse selector 2. The clock pulses are sent to a channel separation counter 3 and advances the well-known counting circuit provided therein to produce N outputs thereof, a series of channel separating pulses for every channel. The channel separating pulses for the speech channels and the multiplex code pulses received at the terminal 1 are applied to a decoder 4 to produce a demodulated output for each speech channel.

The synchronizing channel separation pulses, which are one of the outputs of the channel separation counter 3, are applied to the AND gates 5 and 7. The AND gate 5 selects a pulse sequence from a transmitted code pulse sequence while the AND gate 7 selects the number of clock pulses occurring in the synchronizing channel pulse time interval to cause the synchronizing code sequence generator 8 to operate. The synchronizing code sequence generator 8 which comprises a sequence or ring counter and OR circuit as described in my August 19, 1960, copending application is for producing a predetermined synchronizing pulse code sequence, such as 10101, which has been agreed upon for the transmitting and receiving terminals of the channel. The generator is under the control of the output pulses from the AND gate 7. The sequence generator has a circuit construction which will maintain the same position in the code pattern as that produced at the preceding sampling time during which trigger pulses have not been received from the AND gate 7 during the synchronizing channel selecting time interval. Circuit 6 is the so-called "Exclusive OR circuit" which develops no output when the pulse input from the AND gate 5 and the pulse input from the synchronizing code sequence generator 8 coincide with each other, while providing output pulses only when said input pulses are not in coincidence. In other words, a synchronizing pulse code sequence produced at the receiver can be compared with the code sequence at a synchronizing code time interval of the transmitted code pulse sequence. The output of the Exclusive OR circuit is fed back to the channel separation counter 3 and to the synchronizing code sequence generator 8 to reset them to zero position. In this manner, the digital phase is shifted successively until synchronism is restored.

It should be noted, however, that inasmuch as the pulses of each channel are coded by a voice signal or the like, the existence of the pulses shows a probability distribution and that the restoration of the synchronism is accordingly a stochastic process. There are $q$ synchronizing pulses in a frame. If an error is found at any one of the $q$ pulses, resetting is performed. If, however, no error is found at all of the $q$ pulses, the same operation is repeated, after one frame has passed, at the synchronizing pulses of the next frame. Consequently, if the probability of finding an error in one frame is made large, the restoring time is shortened. Let $p$ be the probability of a phenomenon wherein an error is not found at a synchronizing pulse, then the probability of a phenomenon wherein an error is ultimately found at the $q$th synchronizing pulse is $p^{q-1}\cdot(1-p)$, which can be made small by making $q$ large, thus remarkably shortening the restoring time.

In a system where the channel separation counter is shifted by one bit each time an error is found, the synchronism state returns quite frequently only after the channel separator is shifted N times, or the number of pulses in a frame. In the resetting sequence system, on the other hand, the number of shifts required for one frame shift is small, because $s$ shifts are simultaneously performed if the error is found at the $s$th pulse of the $q$ synchronizing pulses. In general, however, it does not follow that the synchronism is restored by one frame shift. Only when the error is found at the very $N_0$th pulse ($m\cdot n=N$) the restoring procedure is completed by one frame shift, and a complete synchronism is regained. If no error is found at the $N_0$th pulse, the synchronism can not be restored by one frame shift and the restoring procedure must be repeated from the beginning.

Figure 3:
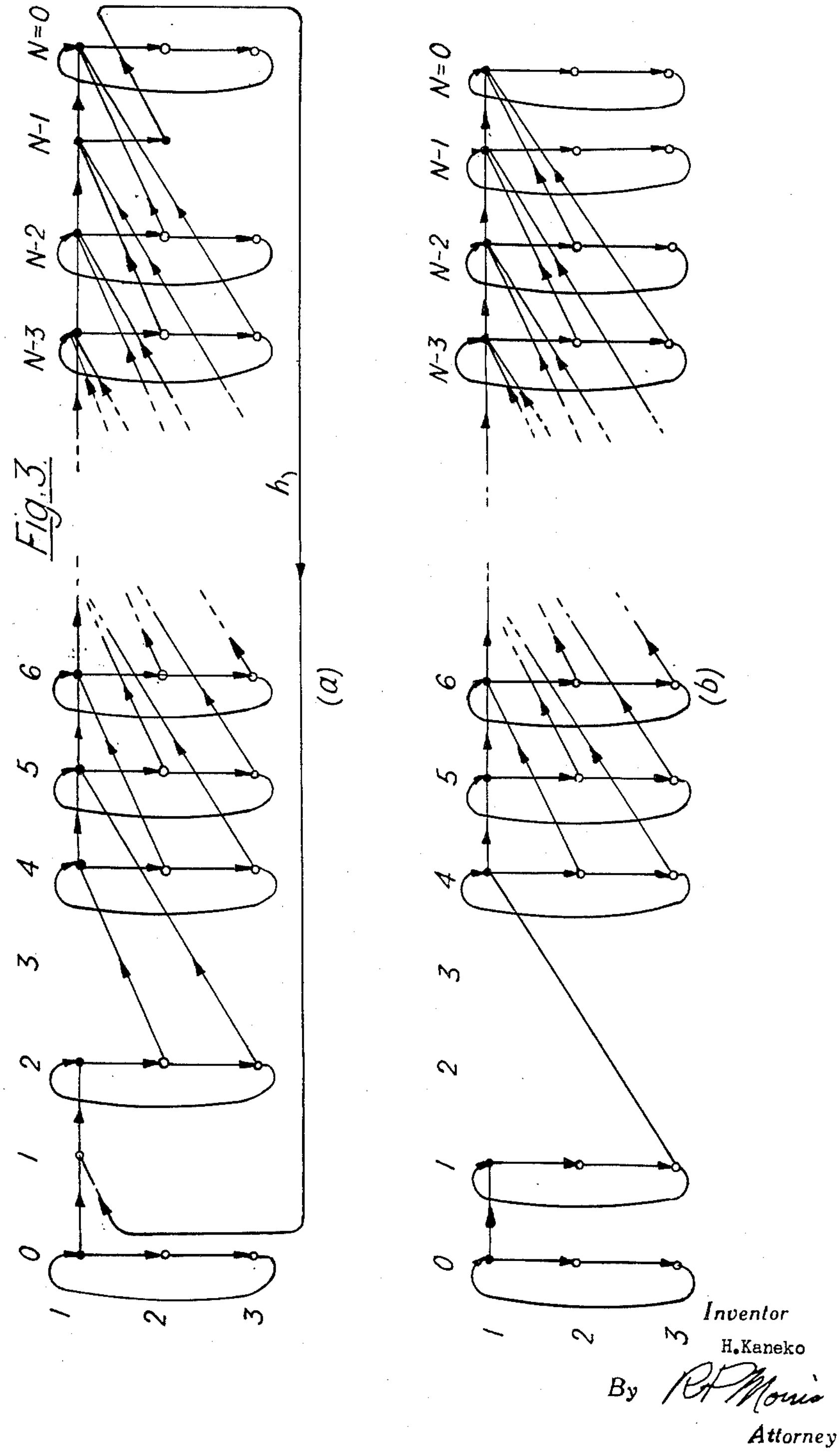

FIG. 3*a* shows a state diagram of synchronism restoration in the case where $q=3$ and where the synchronizing code pattern is 101. In this figure, "0" and "N" show synchronism. If synchronism has collapsed for some reasons and the state has shifted to "1," then the shifting of the state can be represented by groups of directional lines as shown, because the state will be shifted horizontally with a probability of $(1-p)$ upon error discovery, while it will be shifted vertically with a probability of $p$ upon no error discovery. When the state $(N-2)$ is reached and if the error is not found at the first and the second synchronizing pulse, the error can never be found at the third synchronizing pulse because of the agreement of the code in the pulse sequence with the code of the code sequence. In such a case, therefore, the state returns from $s=3$ through the pulse points (not shown) of the speech channels to $s=1$ and such shifting is repeated until the error is eventually found at the first or at the second synchronizing pulse. If the error is found at the second synchronizing pulse, shifting is performed by two bits to reach the state $N=0$ and the synchronized condition is restored. If the error is found at the first synchronizing pulse, shifting is performed by one bit to reach the state $(N-1)$. When the state $(N-1)$ is reached and if error is found at the first synchronizing pulse, one bit shift will restore the synchronized condition. If the error is not found at the first synchronizing pulse, the error is found without fail at the second synchronizing pulse. Then, a two bits shift will return the state to "state 1" along the transverse line designated by $h$ in FIG. 3*a*, requiring the same procedure to be repeated again. This means that the probability distribution of the number of one frame shifts is the so-called geometrical distribution. Therefore, the average value $E_1$ of the restoring time and the standard deviation $\sigma_1$ will necessarily increase, with resulting lengthening of the time interval in which the multiplex communication is hindered. An example of this state is shown by $E_1$ and $\sigma_1$ of FIG. 7.

The synchronizing system of this invention improves the faults of the above resetting sequence system, decreases the average value of the synchronism restoring time, and remarkably improves the standard deviation of the probability distribution of the restoring time. In general, the synchronizing code sequence for use in a common resetting type synchronizing system should be so selected that the sequence of $q$ pulses may be of the least probable occurrence in the multiplex pulse sequence. In this invention, however, either 1 or 0 pulses are employed for all $q$ pulses. It will be shown hereafter that this will result in the average value and the deviation of the restoring time being decreased and in the circuit construction being considerably simplified.

Let the synchronizing code sequence for $q=3$ be 111 as shown in FIG. 1*c*, then the state diagram is represented in FIG. 3b. In this figure "0" and "N" show the same synchronized condition. If, by some reason, the synchronism happens to be pulled out of step, the condition shifts from condition "0" to "1." Then the third synchronizing pulse finds the error as shown in the table in FIGURE 2b and a three-bit shift is made. Thereafter, an $s$-bit shift is made every time an error is found by the $s$th synchronizing pulse. When condition $(N-3)$ is reached and if an error is found at $s=3$, the synchronism is restored. When condition $(N-2)$ is reached and if an error is found at $s=1$, a shifting to condition $(N-1)$ is made. If an error is found at $s=2$, the synchronism is restored.

Figure 2:
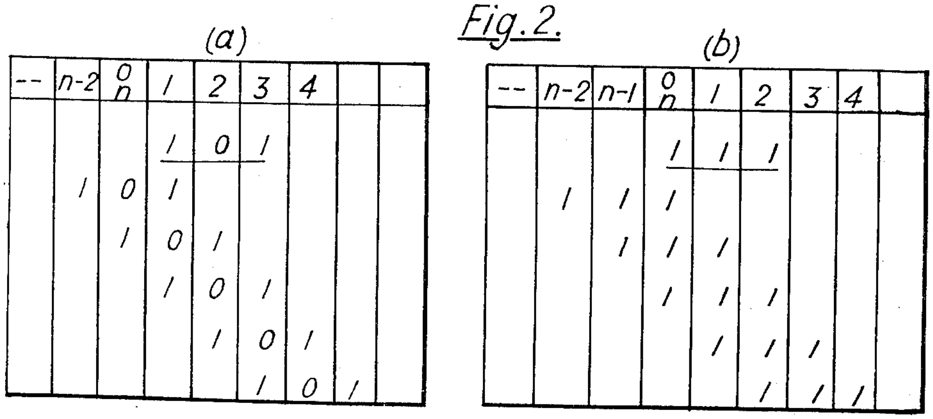

At $s=3$, an error is never found. After all, an error is found either at $s=1$ or 2 without fail. When condition $(N-1)$ is reached and if an error is found at $s=1$, the synchronism is restored. If no error is found at $s=1$, an error is never found at $s=2$ or 3 as shown in FIG. 2b and so the phase returns through the speech channel pulse points (not shown) to $s=1$ in the next frame. Such process is repeated until an error is eventually found at $s=1$ in condition $N-1$. (It will be seen therefore that according to the system of the invention the condition never returns to 1 from $N-1$). This means that the synchonism is restored with the probability 1 by one-frame shift after all. Consequently, if a synchronizing code sequence of all marks, such as 11111 is employed, one frame shift will return the state to the original condition. This results in the average value of the synchronism restoring time being decreased and in the standard deviation being likewise decreased due to the fact that the procedure of one-frame shift is not of probability distribution. Although the above explanation is made for a small value of $q$, the same will apply for a larger value of $q$.

Figure 7:
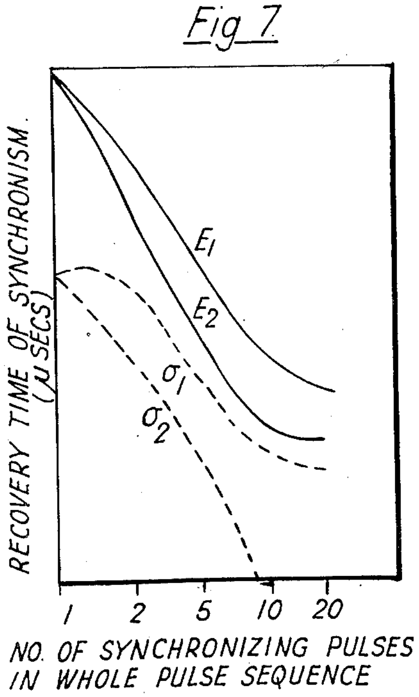
FIG. 7 shows a graphical representation of the recovery time of synchronism when various codes are employed.

To show an example of the restoration characteristics employing the system of this invention, the average value $E_2$ and the standard deviation $\sigma_2$ are shown in FIG. 7, as noted. It is to be noticed that they are much superior to $E_1$ and $\sigma_1$ which are the restoration characteristics of the resetting sequence system employing the series of mark and space synchronizing code sequence.

Figure 5:
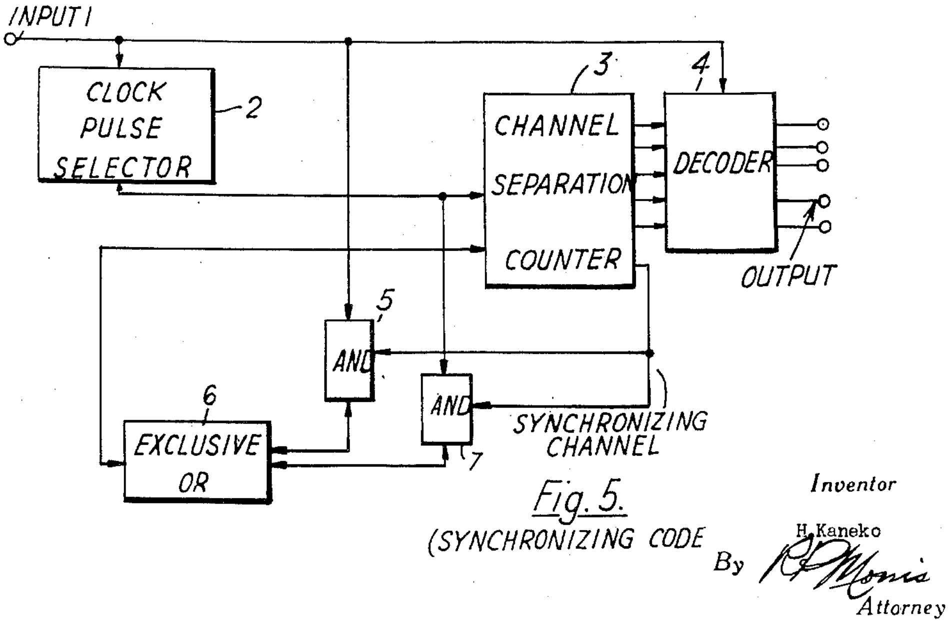
FIG. 5 shows a schematic block diagram of a receiving terminal station equipment illustrating the sequence type of synchronizing system when the synchronizing code is 11111.

Furthermore, the circuit arrangement of the receiving terminal of the receiving terminal equipment empolying the system of FIG. 5 is simplified compared with the noted series mark and space, resetting type sequence system of FIG. 4 since the need for providing a code sequence generator is obviated. This occurs since the all mark code 111 or 11111 is the output of the AND gate 7.

Figure 6:
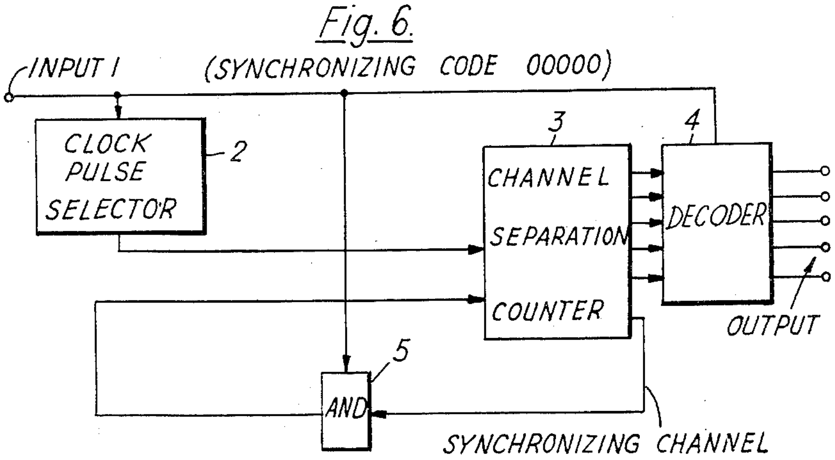
FIG. 6 shows a schematic block diagram of a receiving terminal station equipment illustrating the sequence type of synchronizing system when the synchronizing code is 00000.

FIG. 6 shows a block diagram of the receiving terminal equipment for use in the resetting type sequence system wherein the synchronizing code is 00000. When such code sequence is used, the pulse sample by the AND gate 5 at the normal and correct synchronizing pulse point is 000.

The clock pulse selector 2 can select the fundamental repetition frequency even in the absence of pulses of the 00000 synchronizing code. For example, there are $q$ synchronizing pulses in one frame of N pulses with N usually being much larger than $q$. Other $N-q$ pulses in a frame are assigned for signalling channels and are either on or off according to the existence or non-existence of pulses which represent voice or other signals. Thus, there are many on-pulses even in the absence of synchronizing code pulses.

If a pulse appears in the output of the AND gate 5, it means a mis-connection and the channel separation counter 3 can be reset by that output pulse. As a result the AND gate 7 and the pattern generator 8 are unnecessary, and the whole circuit is much simplified. Needless to say, by a proper logic conversion by Boolean algebra, the circuit can be changed in various ways so that it may be practicable.

As explained above in detail, the system of this invention using an all-mark or an all-space code for its synchronizing pulse sequence provides a resetting type sequence system which has superior restoration characteristics compared with the system in which a one-bit shift is made for every error discovery. Also the invention is applicable, not only to multiplex PCM transmission of voice telephone, telemetering, and digital information, but also to other data processing.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A synchronizing circuit arrangement for a time-division multiplex system employing pulse code modulation and including a plurality of signalling channels and a synchronizing channel, said channels having a predetermined repetition frequency, the pulse code representing the signals in said signalling channels being composed of mark and space bits while the pulse code of the synchronizing channel is composed of only mark bits comprising: an input terminal for receiving both the signalling code pulses of the signalling channels and the synchronizing code pulses; a channel separator, having a plurality of signal channel outputs and a synchronizing channel output; means connected to said input for generating a train of clock pulses coincident with, and having a recurrent frequency equal to, the fundamental repetition frequency component of the received wave; means for triggering said channel separator with said clock pulses; a first logic circuit connected to said input terminal and said synchronizing channel output of said channel separator for gating the received code pulses with the synchronizing channel output; a second logic circuit connected to said clock pulse generating means and said synchronizing channel output of said channel separator for gating the clock pulses with the synchronizing channel output; a third logic circuit connected directly to the first and second logic circuit outputs and responsive to a non-coincidence therebetween for producing an error indication; and means responsive to said error indication for resetting said channel separator to the zero pulse position of the synchronizing code sequence.

2. A synchronizing circuit arrangement for a time-division multiplex system employing pulse code modulation and including a plurality of signalling channels and a synchronizing channel, said channels having a predetermined repetition frequency, the pulse code representing the signals in said signalling channels being composed of mark and space bits while the pulse code of the synchronizing channel is composed of only space bits, comprising: an input terminal for receiving both the signalling code pulses of the signalling channels and the synchronizing code pulses; a channel separator, having a plurality of signal channel outputs and a synchronizing channel output; means connected to said input for generating a train of clock pulses coincident with, and having a recurrent frequency equal to, the fundamental repetition frequency component of the received wave; means for triggering said channel separator with said clock pulses; a logic circuit connected to said input terminal and said synchronizing channel output of said channel separator for gating the received code pulses with the synchronizing channel output, whereby any output pulse on said logic circuit is indicative of an error in synchronism since said synchronizing code is composed of only space bits; and means directly connected to the output of said logic circuit and responsive to a pulse thereon for resetting said channel separator to the zero pulse position of the synchronizing code sequence.

References Cited in the file of this patent

UNITED STATES PATENTS 2,949,503 Andrews -------------- Aug. 16, 1960